United States Patent [19]

Buckley et al.

[11] Patent Number: 4,760,553
[45] Date of Patent: Jul. 26, 1988

[54] TERMINAL SYSTEM CONFIGURATION TRACING METHOD AND APPARATUS

[75] Inventors: James F. Buckley, Hyde Park, N.Y.; Garrison Q. Kenney, Raleigh; Richard M. Morrison, Cary, both of N.C.; Michael J. Stember, Kingston; Edward J. Wendell, Woodstock, both of N.Y.

[73] Assignee: International Business Machines Corporation, Armonk, N.Y.

[21] Appl. No.: 740,094

[22] Filed: Jun. 3, 1985

[51] Int. Cl.⁴ ............................................. G06F 9/00
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 4,025,906 | 5/1977 | Riikonen | 340/172.5 |
| 4,103,338 | 7/1978 | Cizmic et al. | 364/900 |
| 4,266,294 | 5/1981 | Daughton et al. | 364/900 |
| 4,271,479 | 6/1981 | Cheselka et al. | 364/900 |
| 4,298,935 | 11/1981 | Lange et al. | 364/200 |
| 4,410,984 | 10/1983 | Negi et al. | 364/200 |
| 4,514,806 | 4/1985 | Hartig | 364/200 |
| 4,556,953 | 12/1985 | Caprio et al. | 364/900 |
| 4,563,736 | 1/1986 | Boudreau et al. | 364/200 |

FOREIGN PATENT DOCUMENTS 54-73531 6/1979 Japan .
55-56235 4/1980 Japan .

OTHER PUBLICATIONS

IBM Technical Disclosure Bulletin, H. Johnson, Workstation Disconnect Verification Circuit, vol. 26, No. 10A, Mar. 1984.

Primary Examiner—Gareth D. Shaw
Assistant Examiner—John G. Mills
Attorney, Agent, or Firm—Frederick D. Poag

[57] ABSTRACT

A terminal controller system is described wherein several feature cards are plugged into slots on a board, and I/O signal cables are connected between cards and/or remote multiplexors or terminals. A special purpose card identification (ID) bus is driven by the feature cards and received by an ID adapter. The ID adapter has one select line running to each of the slots on the board. The ID adapter enables the select lines one at a time, whereby the selected feature cards drive their IDs onto the ID bus. A processor records the slot population by ID and also can analyze the IDs to determine if a valid configuration exists. The processor then performs a wrap test on each of its ports. This test alters the ID which it wraps and by comparison with the IDs recorded originally, this enables the processor to logically establish the physical link to particular cards connected to the ports.

4 Claims, 8 Drawing Sheets

| SOCKET | ID | ID | PORT |
|---|---|---|---|
| 100 | 48 | 48 | |
| 102 | 50 | 51 | 42 |
| 104 | 38 | 38 | |
| 108 | 0 | 0 | |

FIG. 7

| PORT | ADDRESS | TYPE |
|---|---|---|
| 40 | 0-7 | TMA |
| 42 | 8-15 | TMA |
| 44 | 16 | DEVICE |
| 46 | 17-24 | FOB |

TERMINAL SYSTEM CONFIGURATION TRACING METHOD AND APPARATUS

BACKGROUND OF THE INVENTION

1. Field of the Invention

This invention relates to data terminals systems and more particularly to a multi-tier multiplex system having means to aid in set-up by the user, including means for the system to analyze its own architectural configuration and means for the user to detect and identify faulty parts.

2. Prior Art

Methods to detect module population in a data processing system for various purposes are well-known. Examples are seen whereby memory modules of various sizes are queried for assigning addresses in a system address space. Other arrangements are known for identifying and testing individual modules in a system. Frequently these modules are in the form of cards plugged into sockets of a buss system, and in some cases, the user has the option of plugging various cards into sockets of the system more or less at random.

It is also well-known to perform wrap tests on transmission lines whereby, the problem solved by the test method is relatively simple, e.g. the question of whether there is a working device at the other end of the transmission line.

There exists a need to perform system analysis in more complex multi-terminal systems. Such systems may include a local or remote host processor, a terminal cluster control processor, and terminal devices connected directly to the latter or through fan-out devices which themselves may be native or remote to the cluster control processor. Various control and transmission protocols may exist in corresponding tiers in such a system or even in the same tier, and so systems self-analysis and test becomes a complex problem.

SUMMARY OF THE INVENTION

In accordance with the invention, in a terminal controller system, one processor card and several feature cards are plugged into slots on a board, and I/O signal cables are connected between cards and/or remote multiplexers or terminals. A special purpose card identification (ID) bus is driven by the feature cards and received by the ID adapter of the processor. The ID adapter has one select line running to each of the slots on the board. The ID adapter enables the select lines one at a time, whereby each selected feature card drives its ID onto the ID bus. The processor records the slot population by ID and also can analyze the IDs to determine if a valid configuration exists. The processor then performs a wrap test on each of its ports which may be connected to a feature card. This test alters the ID of the card by a signal cable which it wraps and by comparison with the IDs recorded originally, this enables the processor (microcode operated controller) to logically establish the physical link to particular cards connected to the ports.

According to other aspects of the invention there is provided a method of tracing connections in a distributed terminal system which comprises:

Providing a card slot query system and interrogating the card slots in sequence; receiving identifiers from cards in said card slots; recording in a slot table the association of identity of card identifiers with slots; wherein the cards are connected in an unknown manner to ports of a central unit; and the method further comprises sending a wrap-around command from the ports in sequence; altering the identifier of each card in response to the wrap-around command; reporting the altered identifiers in response to a reinitiation of interrogating step; comparing the altered identifiers to those recorded in said table, and associating the cards thus identified with the port which gave rise to their association.

Other objects features and advantages will be apparent from the specification as a whole, including the drawings and claims.

DETAILED DESCRIPTION

Figure 1:
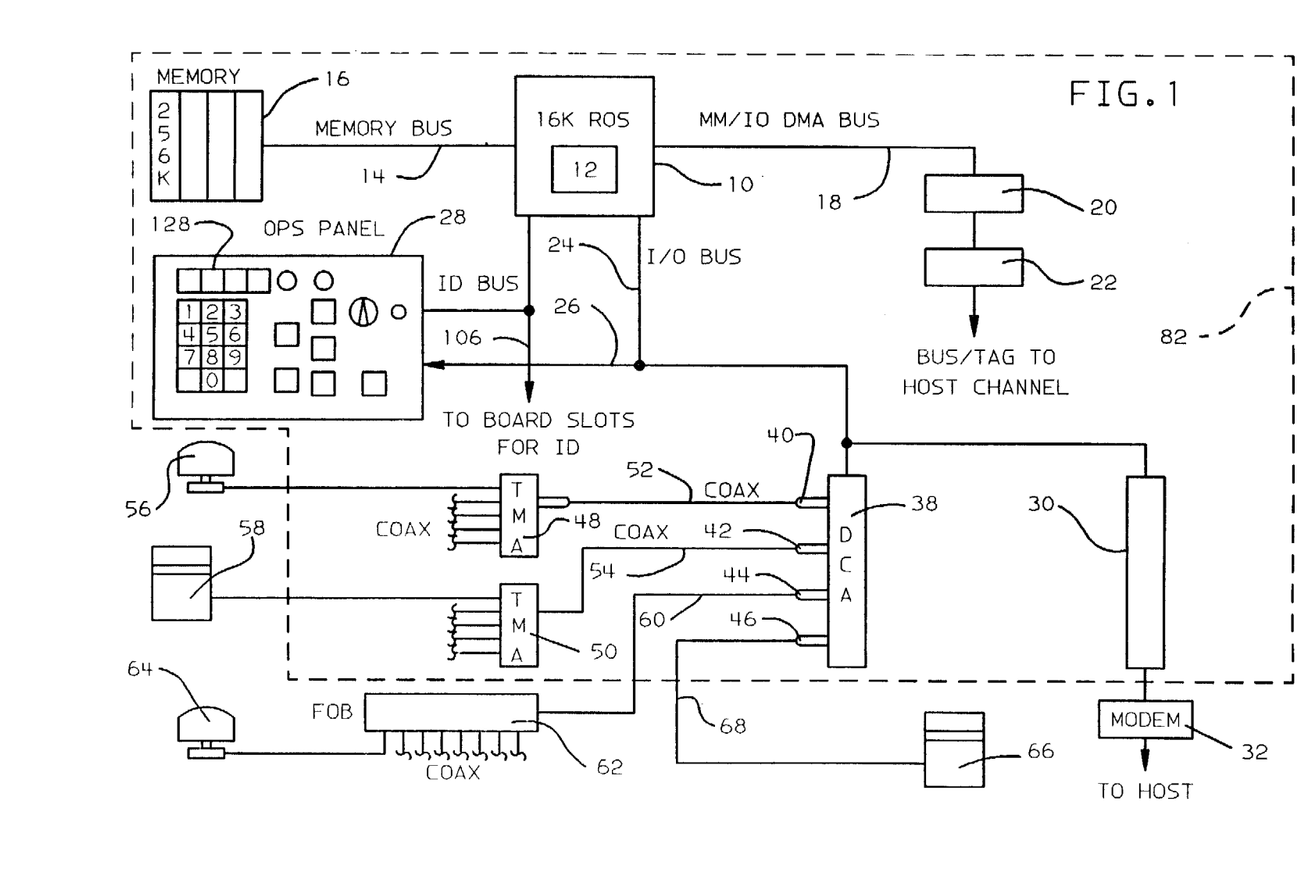
FIG. 1 is a diagrammatic representation of a terminal system embodying the invention.

The system of FIG. 1 includes an intelligent controller 10 including a micro-processor 12 and native read only storage for its control. The controller 10 has a memory bus 14 connecting to a RAM storage 16 having sufficient volume for the needs of the system. Also included is a memory mapped I/O DMA bus 18 connected via an adapter 20 and a driver receiver 22 to a host channel.

The controller 10 also has an I/O bus 24 for supporting the terminals connected to it as well as for providing one of the routes 26 of communication to an operator control panel 28 which is utilized in accordance with the invention as will be described. The I/O bus 24 connects to a number of units such as an adapter 30 for a modem 32 connecting to a remote host.

However, the principle adapter connected to the I/O bus 24 is a device cluster adapter 38 having, in the illustrated embodiment four ports 40, 42, 44, and 46. Two of the ports, 40, 42 are connected to respective terminal multiplex adapters 48, 50 via respective coaxial cables 52, 54, and each of the terminal multiplex adapters 48, 50 supports a plurality, in the example shown 8, of terminals such as a keyboard display work station 56, a printer 58, and so on. Whereas the data flow on the I/O bus 24 is in parallel, the communication from the device cluster adapter 38 to the terminal multiplex adapters 48 and 50 and thence to the various terminals 56, 58 connected thereto is by serial coax lines. Another of the device cluster adapter ports 44 is shown connected via coaxial cable 60 to a remote fan-out unit 62 which, like the terminal multiplex adapters 48 and 50 can also support a plurality of devices such as the work station indicated at 64. Still another port 46 of the device cluster adapter 38 connects to a single unit such as a printer 66 via coax 68.

Figure 2:
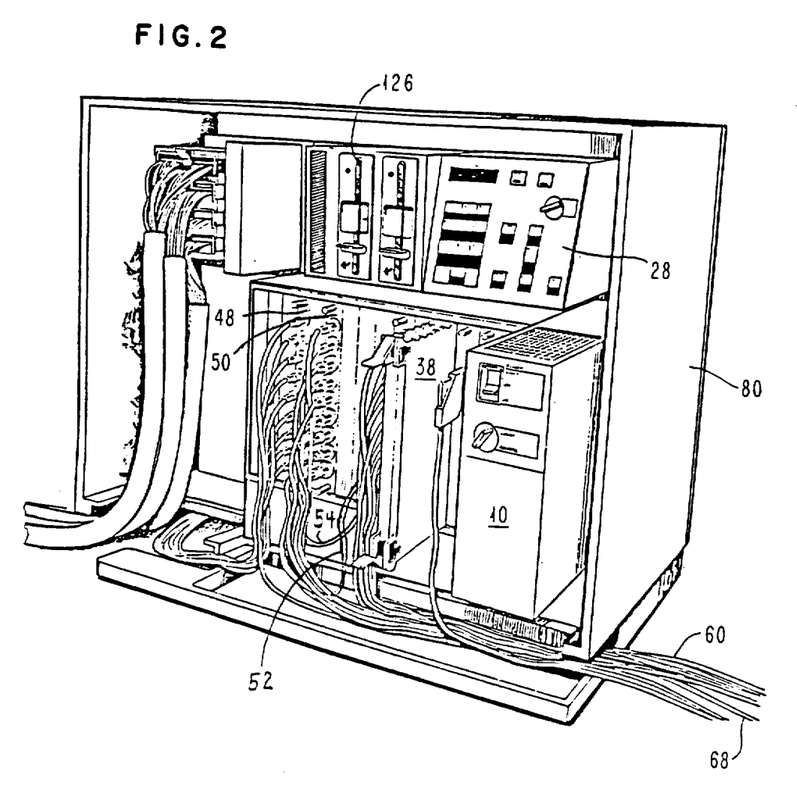
FIG. 2 depicts a terminal cluster controller forming part of the system of FIG. 1.

FIG. 2 shows an equipment cabinet 80 which houses the elements of system outlined in FIG. 1 by the dot dash line 82. A cover panel has been removed to expose these parts which include terminal multiplex adapters 48 and 50 and the device cluster adapter 38 as pluggable modules, the later of which of shown partly withdrawn. Each of the modules plugs into a corresponding socket, but these are user installable parts and may be plugged into any of several sockets, it being a feature of the invention to include means to determine what modules have been plugged and which sockets they have been plugged into. As seen in the drawing, the various cables 52, 54, 60, 68, although draped in an orderly manner, can be intermixed in such fashion that tracing visually would be time consuming, and it is a further feature of the invention to provide means to determine which ports of the device cluster adapter 38 are connected to which local and remote units and, indeed the character of those units.

Figure 3:
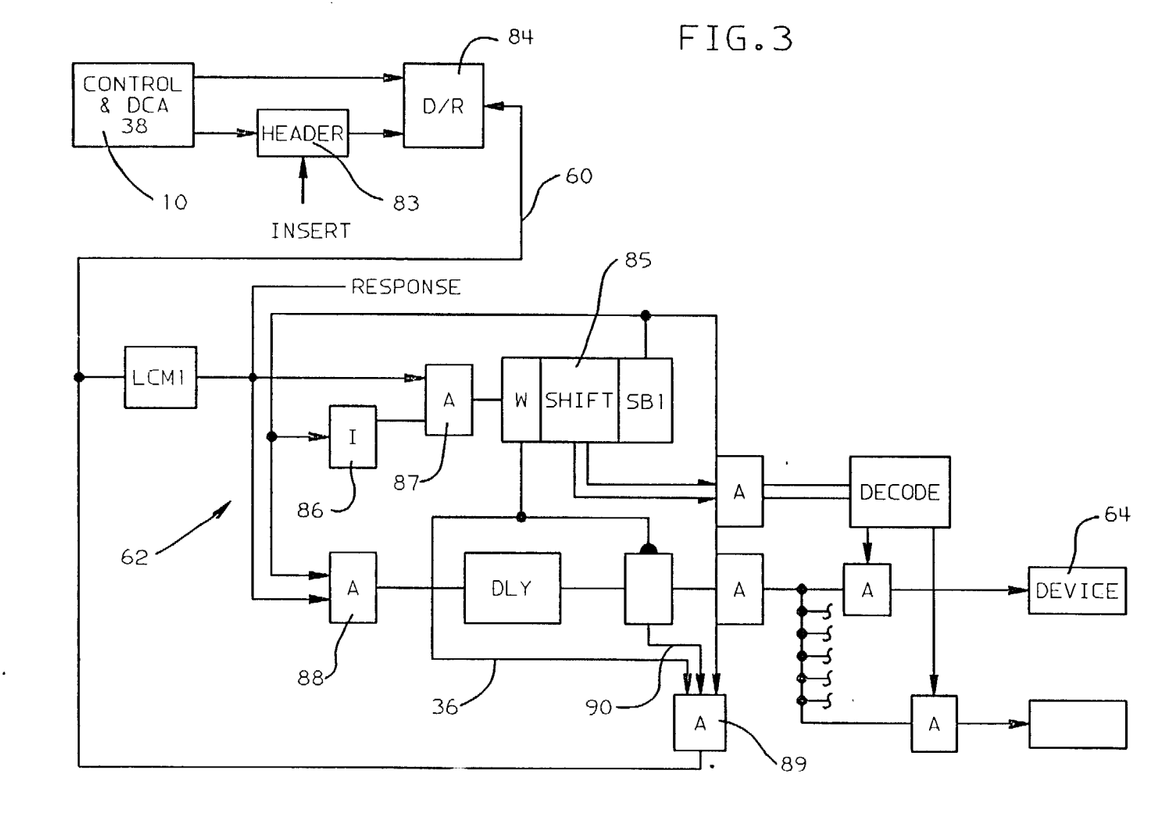
FIG. 3 shows diagrammatically a remote terminal multiplexer unit for connecting a number of terminals in the system of FIG. 1 and including a wrap test capability.

As shown in FIG. 3 the single coax connection 60 can be used between the device cluster adapter 38 of the controller 10 and the remote fan-out box 62 for a number of data terminal devices such as keyboard displays, one of which is indicated at 64 and/or printers. The controller inserts a terminal device address on each outbound message which it transmits via the common coax 60. The fan-out box 62 receives the messages from the coax 60 and distributes them to the addressed terminal devices. In the described system all traffic from the terminals to the controller is in direct response to a poll or other command received from the controller and intended for that terminal, and so it is not necessary to provide a terminal identification on such response.

To test the fan-out box 62, it is desirable to be able to send a test message (including a terminal address header) out to the fan-out box and have the fan-out box return it as if it were a response from a terminal. The device cluster adapter 38 inserts device address preceding the normal message to the device and the fan-out box is provided which strips the address, decodes the address, selects the proper fan-out port, and, in normal use, relays the normal message to the correct terminal device.

FIG. 3 shows, schematically, how this can be done and also how a wrap test can be accomplished. The device cluster adapter 38 inserts a sync bit SB1, device address ADDR and parity bit P1 into shift register means 83 ahead of the usual sync bit SB2, command byte and parity bit P2 destined for the device. The coax driver/receiver 84 inserts line quiescence bits and a starting code waveform. Then SB1, ADDR and P1 are shifted out of the register 83 onto the coax line 60 in that order. At the remote fan-out box this signal is recieved from the coax by a line control module LCM1, and SB 1 and the device address are stored. In the simple example shown, this storage is in a shift register 85 and the propagation of the SB 1 to the end of register 85 is used as a signal to mark the end of the added bits which are to be stripped from the message before the remainder is sent on to the addressed device and also used, via inverter 86, to decondition AND gate 87, thereby blocking further input from LCM1 to register 85. At the same time, the SB1 signal enables another AND gate 88 by which the remaining portions of the message are routed through an 8-bit delay in the message during which the device address ADDR is used to set up the message routing. For this purpose, the address portion in the address shift register is gated to a decode circuit which, in turn, conditions a single gate (1 out of 8) in the coax leading to the selected device.

In order to provide the desired wrap test, an arrangement is provided which allows the controller to send a diagnostic wrap command to the fan-out box which, in turn, holds and re-transmits the data portion of the transmission back to the controller. This is done by:

(1) Changing the controller's Driver/Receiver to insert a wrap mode bit along with the device address.

(2) Adding the logic to the fan-out box which will decode wrap mode, store the outbound transmission, and send the stored transmission back through the fan-out box to the controller.

The wrap bit W is the last bit of the address field stored in the fan-out box register 85. When SB1 is detected, it conditions AND circuit 89. The other two inputs to AND 89 are the wrap bit and the output on line 90. Thus, the output from shift register DLY is re-transmitted back to coax 60 as a "response" signal instead of being fed to the addressed device.

Figure 4:
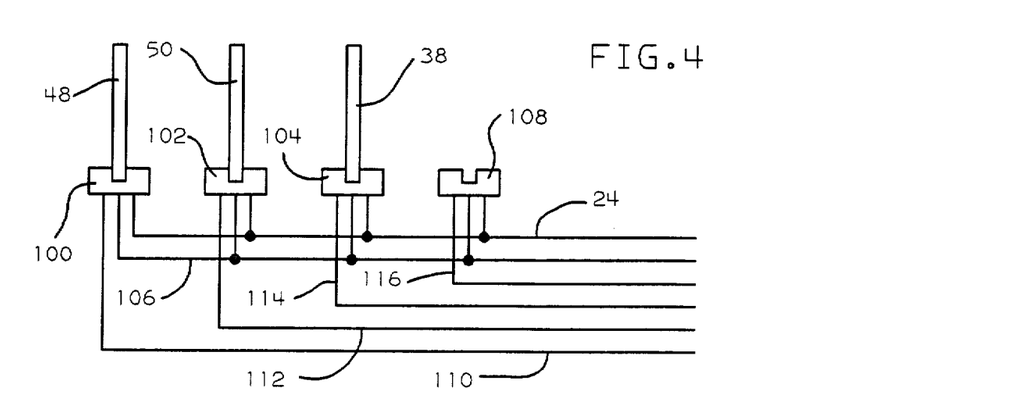
FIG. 4 shows a card identifier system forming a part of the controller of FIG. 2 and operable to ascertain the identity and slot location of cards or modules therein.
Figure 5:
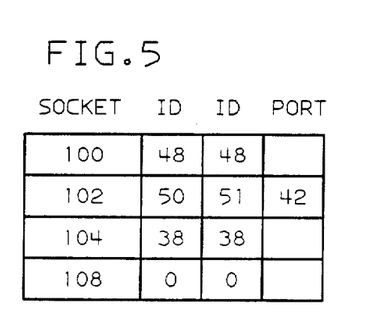
FIG. 5 depicts a module versus slot table built by the processor of the controller of FIG. 2 utilizing the slot query system of FIG. 4.

FIG. 4 is a skeletal drawing showing the cards or modules 48 50 and 38 in their respective sockets by which they connected to the I/O bus 24 and identifier (ID) bus 106. To simplify the drawing, the coaxial cables are omitted from this view. All the sockets not need be populated; an unpopulated one is shown at 108. Nor do they have to be populated in a particular object. However, each socket 100, 102, 104, 108 has an individual interrogation line 110, 112, 114, 116 connected to the processor 10 (FIG. 1) by which the processor 10 can query the cards or modules 48, 50, 38, and so on in the respective sockets one at a time, forcing the module to place its ID on the bus ID bus 106. Thus the processor 10 can build a table of slot versus ID number as shown in FIG. 5. In that figure, decimal numbers which correspond to the parts in FIG. 4 are shown although it will be understood that the IDs are binary numbers such as 8 bit bytes. These ID numbers can be altered in accordance with another feature of the invention as will be described.

When a wrap test as described with reference to FIG. 3 is performed from one of the ports in the device cluster adapter 38 which is connected to a terminal multiplex adapter 48 or 50, the wrap bit logic in the card forces a change of a bit in its ID register. When the cards are again polled by their corresponding interrogation lines 110, 112 it is found that one of the IDs no longer is the same as it was initially. This is represented schematically in FIG. 5 by a second ID column in the table wherein the ID number 50 has been changed to 51. This means that the card plugged into socket 102 is the one which is connected to the device cluster adapter port which issued the wrap command. If no change had occurred in any ID it would mean that the port issuing the wrap command was not connected to a functioning terminal multiplex adapter. If the wrap command was returned but without having caused such an ID change it would mean that it had wrapped a remote fan-out unit such as the unit 62 of FIG. 1. If it were not returned at all it would mean that the port was connected to a single unit such as the printer 66 in FIG. 1 or not connected to any functioning unit. The latter condition can be tested by a poll to the terminal which, if the terminal were present, should be answered by an appropriate message such as explained for example in U.S. Pat. No. 4,271,479. Additionally, the wrap test of the terminal multiplex adapter which resulted in the change of the ID from 50 to 51 as shown in the table of FIG. 5 associates the port 42 with the card in socket 102 and the original ID of that card because it is known that the port 42 is the one from which the wrap test signal was issued. If it had been the port 40, then that would be the port which is associated with socket 102 by a cable connection thereto and so on.

Figure 6:
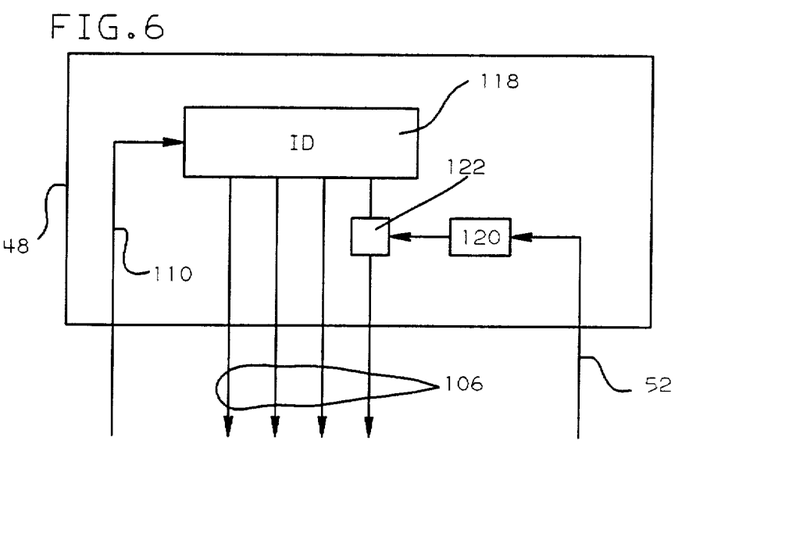
FIG. 6 shows, schematically, circuit means on a card or modules responsive to a wrap command to alter the ID of the module.

It should be understood that the logic on the cards 48, 50 can be variously implemented for the purpose of carrying out the functions of the above described. A simple example is seen in FIG. 6 wherein a wrap command from bus 24, communicated by adapter 38 and coax 52, is decoded at 120 to set a latching inverter 122 to change one bit of the output of the ID register 118 fed to the bus 106 upon interrogation via line 110. This latch 122 is reset by any non-wrap command on the connected coax. Of course, the logic could be of any kind appropriate to the technology of the card and does not per se form any part of the invention.

Figure 7:
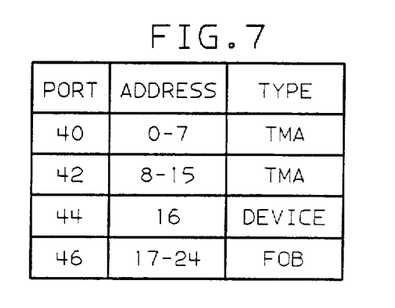
FIG. 7 shows an address assignment table correlating ports of the device cluster adapter of FIG. 2 with various terminal addresses in the system.

FIG. 7 illustrates still another feature of the invention. By performing wrap tests as aforedescribed, it is possible to build the table shown in FIG. 7 in which it has been determined that port 40 being connected to a TMA should be assigned eight addresses, 0–7. The next port 42 also having been found to be connected to a TMA could be assigned the next group of addresses 8–15. The port 44 having been found to be connected to a single device would be given a single address 16 and port 46 having been found to be attached to a remote fan-out box would be assigned eight addresses 17–24.

Figures 8, 8A:
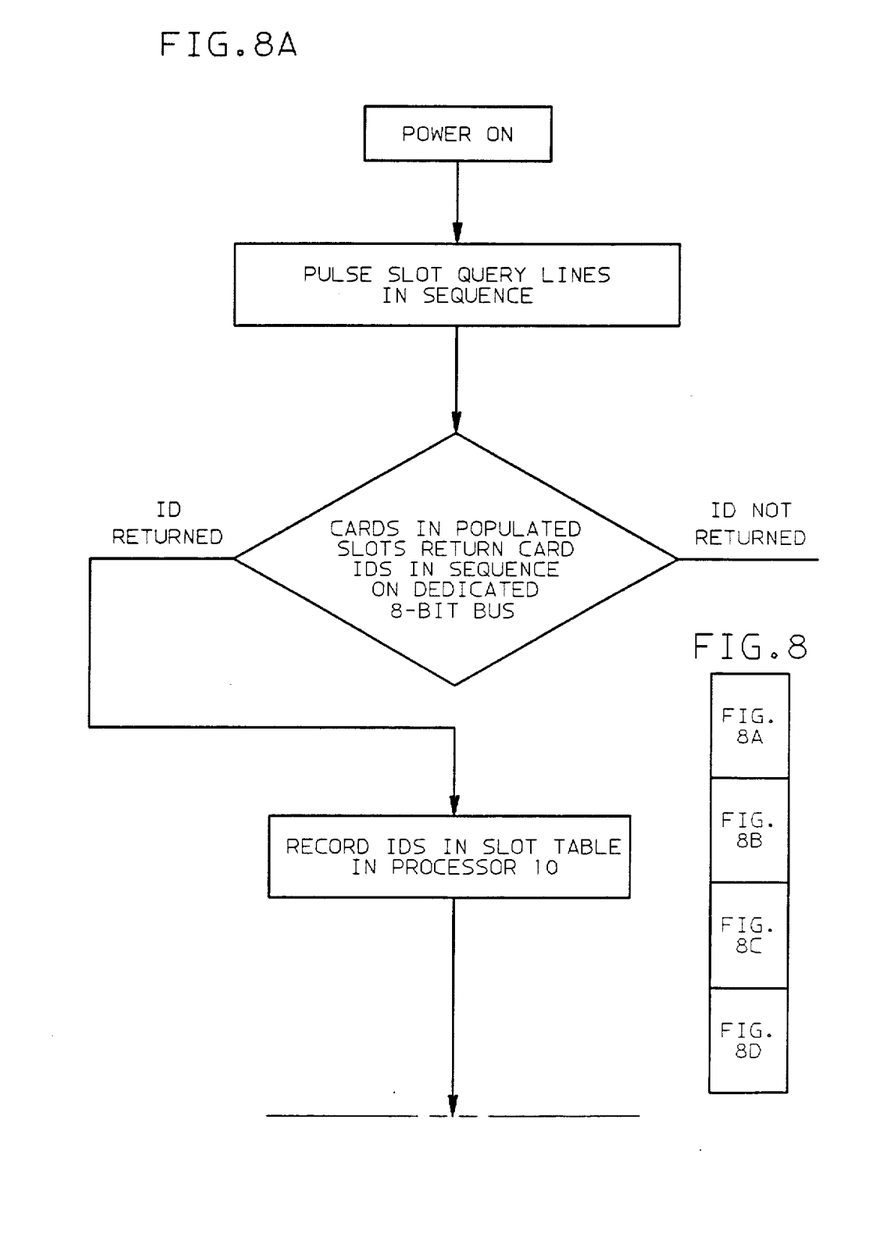
FIG. 8 shows the relationship of FIGS. 8A, 8B, 8C and 8D which together form a flow diagram illustrative of the port, module, and terminal address assignment method of the invention.
Figure 8B:
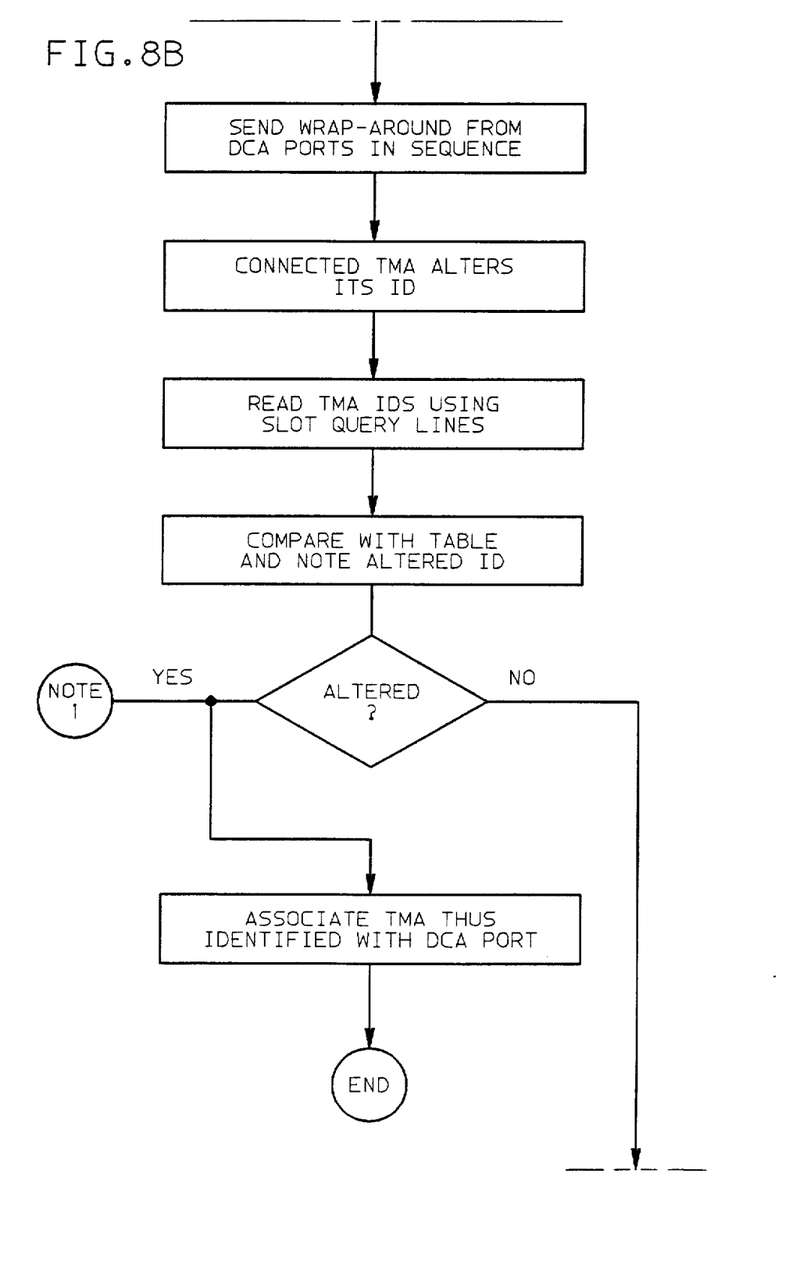
Figure 8C:
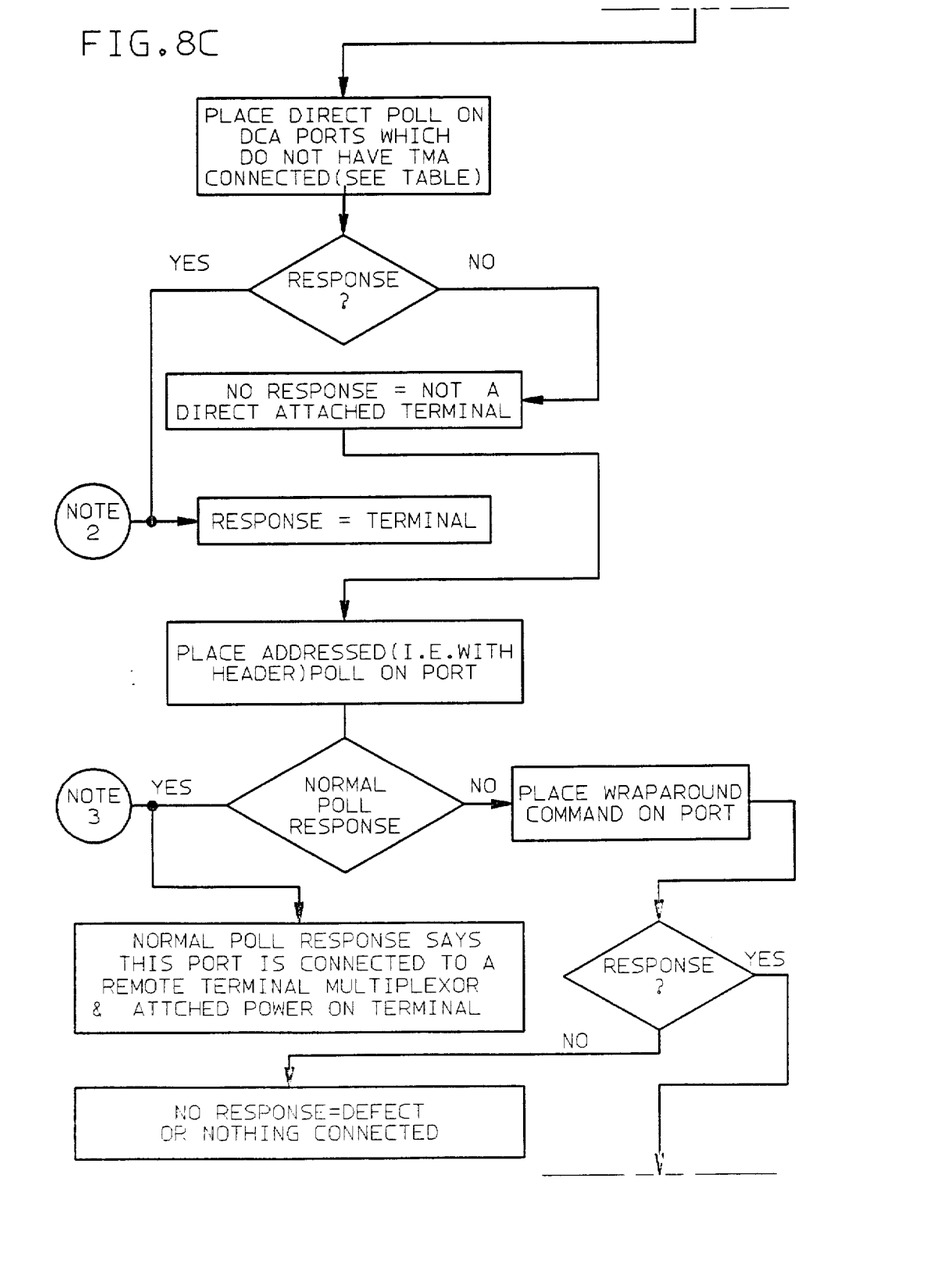
Figure 8D:
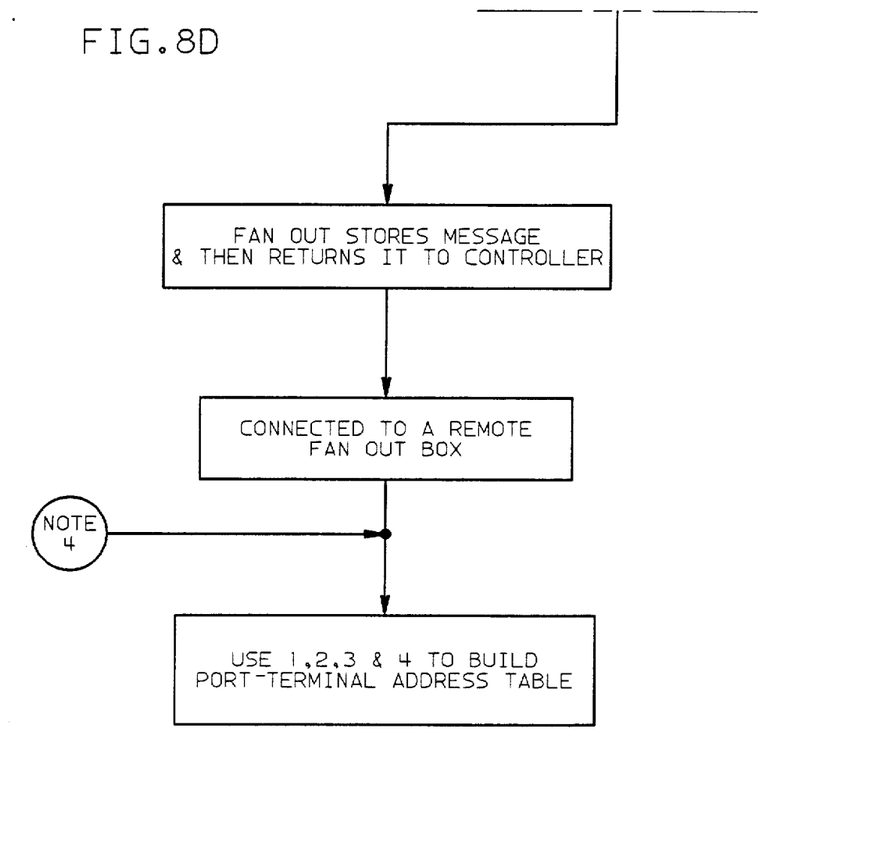

The various described functions with the exception of some hardware functions in the wrap test as above described are most easily carried out by micro-code resident in the processor 10. This micro-code can be loaded into the processor via a diskette drive 126 as seen in FIG. 2. FIG. 8 shows a flow diagram of the operation of the system under the control of such code, utilizing the facilities aforedescribed.

It will be seen that the method and apparatus of the invention provides a facile means whereby the system can not only diagnose itself but present to the user information as to specific elements which may require replacement. This information can be presented via an indicator device 128 on the operator panel 28, FIG. 1 or via any suitable display connected to the processor 10.

The information presented could, for example, direct the user to the exact failing card in terms of its slot number and type for system maintenance purposes or it could show the address assignment configuration table, etc. The ways in which this information could be made available are many and since it is developed by operation of the system itself it can be presented with minimum effort on the part of the user.

In addition to the use in combination with the testing of the port connections of the device cluster adapter 38, the slot/module ID means and method of the invention can be used throughout the system, for example to identify memory cards in RAM 16. Thus, although certain operations have been discussed in detail, aspects of the invention can have other employments within the spirit of the invention and the scope of the appended claims.

What is claimed is:

1. The method of tracing connectors in a distributed terminal system, which method comprises:
   (a) providing a card slot query system and employing said system to interrogate card slots terminal system in sequence;
   (b) receiving card identifier data (IDs) from cards in said card slots;
   (c) recording in a slot table association of identity of card IDs with slots; wherein;
   (d) said cards are connected in an unknown manner to ports of a central unit; and said method further comprises
   (e) sending a wrap-around command from said ports in sequence;
   (f) altering the ID of each card in response to said wrap-around command;
   (g) reporting said altered IDs in response to a reinitiation of step (a) and;
   (h) comparing the altered IDs to those recorded in said table, and
   (i) associating the cards thus identified with the port which gave rise to their identification.

2. The method of claim 1 wherein said wrap-around command is sent via an individual serial bit communication cable to each card.

3. The method of claim 2 wherein said command includes a wrap bit but is otherwise like a command to a terminal.

4. The method of claim 3, further comprising after step (i) assigning terminal addresses to ports in the system according to whether or not said wrap-around command from a given port results in the change of a card ID.

* * * * *